United States Patent
Chandramouli et al.

(10) Patent No.: US 11,071,089 B2
(45) Date of Patent: Jul. 20, 2021

(54) DYNAMIC SWITCHING OF STREAMING SERVICE BETWEEN BROADCAST AND UNICAST DELIVERY

(71) Applicant: NOKIA SOLUTIONS AND NETWORKS OY, Espoo (FI)

(72) Inventors: Devaki Chandramouli, Plano, TX (US); David Navratil, Helsinki (FI); Curt Wong, Bellevue, WA (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 40 days.

(21) Appl. No.: 16/073,358

(22) PCT Filed: Jan. 28, 2016

(86) PCT No.: PCT/US2016/015283
§ 371 (c)(1),
(2) Date: Jul. 27, 2018

(87) PCT Pub. No.: WO2017/131690
PCT Pub. Date: Aug. 3, 2017

(65) Prior Publication Data
US 2020/0100213 A1 Mar. 26, 2020

(51) Int. Cl.
*H04W 72/00* (2009.01)
*H04W 76/40* (2018.01)
(Continued)

(52) U.S. Cl.
CPC ......... *H04W 72/005* (2013.01); *H04L 5/0032* (2013.01); *H04L 12/1881* (2013.01); *H04W 76/40* (2018.02)

(58) Field of Classification Search
CPC .. H04W 72/005; H04W 76/40; H04L 5/0032; H04L 12/1881
See application file for complete search history.

(56) References Cited

U.S. PATENT DOCUMENTS 8,819,264 B2    8/2014 Rodrigues
9,420,563 B2 *  8/2016 Futaki ................. H04W 52/327
(Continued)

FOREIGN PATENT DOCUMENTS

CN    104303545 A    1/2015
WO   2012142428 A1   10/2012
(Continued)

OTHER PUBLICATIONS

International Search Report & Written Opinion dated Apr. 8, 2016 corresponding to International Patent Application No. PCT/US2016/015283.
(Continued)

Primary Examiner — Habte Mered
(74) Attorney, Agent, or Firm — Squire Patton Boggs (US) LLP (57) ABSTRACT

Various communication systems may benefit from a dynamic streaming service. For example, certain streaming services may benefit from an improvement in the switching between broadcast delivery and unicast delivery for a streaming service in a cellular system. A method includes receiving information about a streaming service. The method also includes determining by a network entity in a radio access network whether to deliver data for the streaming service via multimedia broadcast or unicast based on the information and predetermined criteria for evaluating the information. In addition, the method includes triggering a sending of the data via the multimedia broadcast or the unicast.

26 Claims, 5 Drawing Sheets (51) Int. Cl.
*H04L 5/00* (2006.01)
*H04L 12/18* (2006.01)

(56) References Cited

U.S. PATENT DOCUMENTS

| | | | | |
|---|---|---|---|---|
| 10,292,020 | B2* | 5/2019 | Frost | H04W 28/0289 |
| 2008/0109853 | A1* | 5/2008 | Einarsson | H04N 21/2225 |
| | | | | 725/62 |
| 2010/0165902 | A1 | 7/2010 | Kvernvik et al. | |
| 2012/0263089 | A1* | 10/2012 | Gupta | H04W 72/005 |
| | | | | 370/312 |
| 2013/0294321 | A1* | 11/2013 | Wang | H04W 72/005 |
| | | | | 370/312 |
| 2015/0040162 | A1 | 2/2015 | Kotecha et al. | |
| 2015/0131510 | A1* | 5/2015 | Gilbert | H04W 4/06 |
| | | | | 370/312 |
| 2016/0094358 | A1* | 3/2016 | Won | H04L 12/1886 |
| | | | | 370/230 |
| 2016/0309522 | A1* | 10/2016 | Li | H04W 76/40 |
| 2016/0315876 | A1* | 10/2016 | Sinha | H04W 4/80 |
| 2017/0164161 | A1* | 6/2017 | Gupta | H04W 12/0806 |
| 2017/0251341 | A1* | 8/2017 | Frost | H04W 72/005 |
| 2017/0302465 | A1* | 10/2017 | Wang | H04W 76/20 |
| 2018/0014246 | A1* | 1/2018 | Chang | H04W 48/18 |
| 2018/0367961 | A1* | 12/2018 | Kim | H04W 72/005 |

FOREIGN PATENT DOCUMENTS

| | | |
|---|---|---|
| WO | 2013/166423 A2 | 11/2013 |
| WO | 2013187923 A2 | 12/2013 |

OTHER PUBLICATIONS

3GPP TS 23.246 V13.2.0 (Sep. 2015); 3rd Generation Partnership Project; Technical Specification Group Services and System Aspects; Multimedia Broadcast/Multicast Service (MBMS); Architecture and functional description (Release 13).

3GPP TS 26.346 V13.2.0 (Sep. 2015); 3rd Generation Partnership Project; Technical Specification Group Services and System Aspects; Multimedia Broadcast/Multicast Service (MBMS); Protocols and codecs (Release 13).

3GPP TS 36.321 V12.7.0 (Sep. 2015) 3rd Generation Partnership Project; Technical Specification Group Radio Access Network; Evolved Universal Terrestrial Radio Access (E-UTRA); Medium Access Control (MAC) protocol specification (Release 12).

Aug. 16, 2019 Extended Search Report issued in European Patent Application No. 16888421.1.

NEC: "DISC on MBMS service activation/deactivation further to counting", 3GPP Draft; R2-106488_REL10_LTE_MBMS_DISC_Serviceaction_Deactivationfurthertocounting, 3rd Generation Partnership Project (3GPP), Mobile Competence Centre; 650, Route Des Lucioles; F-06921 Sophia-Antipolis Cedex; France, vol. RAN WG2, No. Jacksonville, USA; Nov. 15, 2010, Nov. 8, 2010.

Communication pursuant to Article 94(3) EPC dated Apr. 30, 2020 corresponding to European Patent Application No. 16888421.1.

Chinese Office Action corresponding to Chinese Application No. 201680084201.1, dated Oct. 26, 2020.

Indian Office Action corresponding to IN Application No. 201817027028, dated Jun. 19, 2020.

\* cited by examiner

DYNAMIC SWITCHING OF STREAMING SERVICE BETWEEN BROADCAST AND UNICAST DELIVERY

BACKGROUND

Field

Various communication systems may benefit from a dynamic streaming service. For example, certain streaming services may benefit from an improved switching of delivery from a broadcast delivery to a unicast delivery in a cellular system.

Description of the Related Art

The Evolved Packet System (EPS), the successor of General Packet Radio System (GPRS), provides a telecommunications framework for providing convergence of voice data and/or data on a Long Term Evolution (LTE) network. The EPS also provides for a new radio interface and new packet core network functions for broadband wireless data access. Some of the EPS core network functions include a Mobility Management Entity (MME), a Packet Data Network Gateway (PDN-GW, P-GW), and a Serving Gateway (S-GW).

A common packet domain Core Network can be used for Radio Access Networks (RAN), the Global System for Mobile Communications EDGE Radio Access Network (GERAN), and the Universal Terrestrial Radio Access Network (UTRAN). Multimedia Broadcast Multicast Services (MBMS) is a third generation partnership project (3GPP) interface that dictates delivery of broadcast and multicast services, both within the cell and the core network itself. MBMS can also be used to deliver television services on a mobile network.

Figure 1:
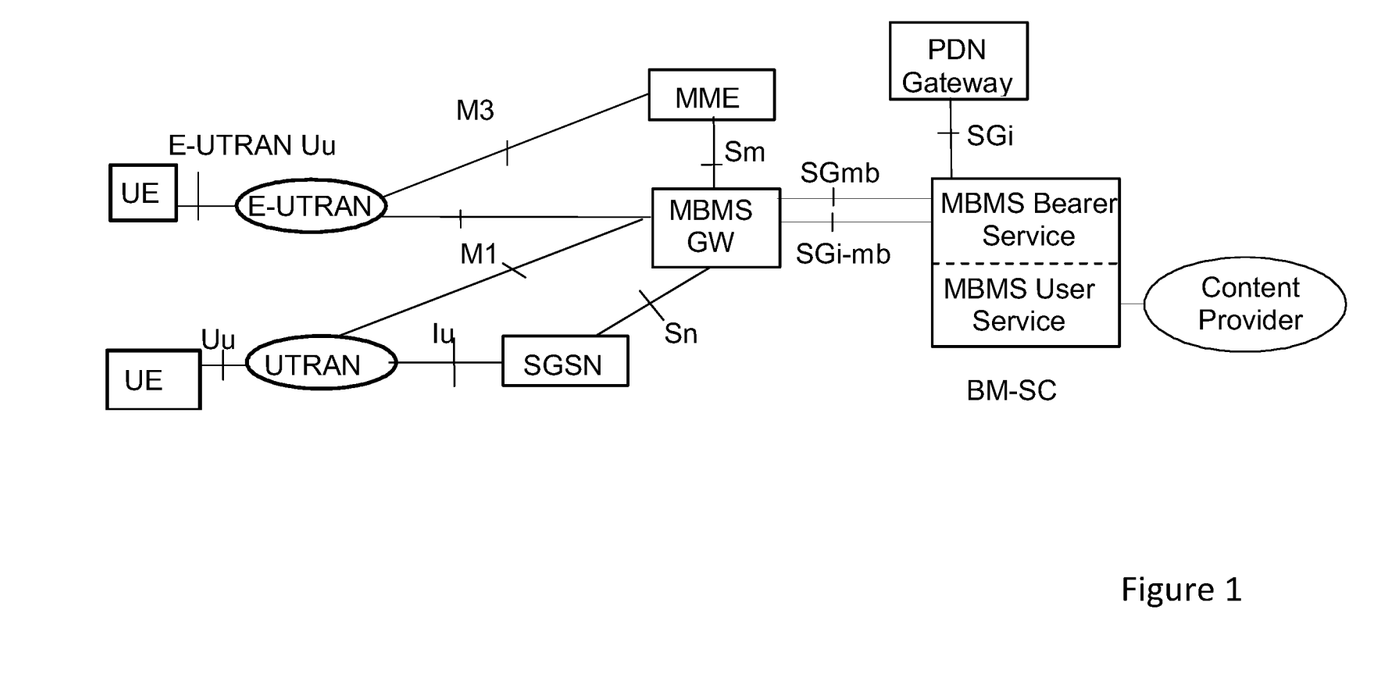
FIG. 1 illustrates the current 3GPP architecture for supporting MBMS.

FIG. 1 illustrates the current 3GPP architecture for supporting MBMS. As can be seen in FIG. 1, the MBMS feature is split into MBMS bearer service and MBMS user service. MBMS bearer service includes a multicast and a broadcast mode. Multicast can include a method of sending Internet Protocol (IP) data to a group of interested receivers in a single transmission. Broadcast, on the other hand, can include a method of sending data from a single point to all connected receivers, regardless of the individual interest of the receiver.

A third method of delivery involves unicast delivery, which is a point-to-point transmission of data over multiple individual unicast bearers. When a network entity changes the service delivery method from a broadcast method to a unicast method, the same data tends to be delivered multiple times over the core and radio networks. In other words, multiple EPS bearers can be used to deliver the same information multiple times when the network entity is changed from a broadcast delivery to a unicast delivery. This may result in an inefficient usage of network capacity.

In addition, the decisions about which delivery method to use may be made by a content provider. The content provider may not have the necessary information about the radio access network (RAN) to make an informed, optimal decision about the appropriate delivery method.

SUMMARY

A method, in certain embodiments, may include receiving information about a streaming service. The method may also include determining by a network entity in a radio access network whether to deliver data for the streaming service via multimedia broadcast bearer or unicast bearer based on the information and predetermined criteria for evaluating the information. In addition, the method can include triggering a sending of the data via the multimedia broadcast bearer or unicast bearer.

According to certain embodiments, an apparatus may include at least one memory including computer program code, and at least one processor. The at least one memory and the computer program code may be configured, with the at least one processor, to cause the apparatus at least to receive information about a streaming service, and determining by a network entity in a radio access network whether to deliver data for the streaming service via multimedia broadcast bearer or unicast bearer based on the information and predetermined criteria for evaluating the information. The at least one memory and the computer program code may also be configured, with the at least one processor, to cause the apparatus at least to trigger a sending of the data via the multimedia broadcast bearer or unicast bearer.

An apparatus, in certain embodiments, may include means for receiving information about a streaming service, and means for determining by a network entity in a radio access network whether to deliver data for the streaming service via multimedia broadcast bearer or unicast bearer based on the information and predetermined criteria for evaluating the information. The apparatus may also include means for triggering a sending of the data via the multimedia broadcast bearer or unicast bearer.

According to certain embodiments, a non-transitory computer-readable medium encoding instructions that, when executed in hardware, perform a process. The process may include receiving information about a streaming service, and determining by a network entity in a radio access network whether to deliver data for the streaming service via multimedia broadcast bearer or unicast bearer based on the information and predetermined criteria for evaluating the information. The process may also include triggering a sending of the data via the multimedia broadcast bearer or unicast bearer.

According to certain embodiments, a computer program product encoding instructions for performing a process according to a method including receiving information about a streaming service. The method may also include determining by a network entity in a radio access network whether to deliver data for the streaming service via multimedia broadcast bearer or unicast bearer based on the information and predetermined criteria for evaluating the information. In addition, the method can include triggering a sending of the data via the multimedia broadcast bearer or unicast bearer.

BRIEF DESCRIPTION OF THE DRAWINGS

For proper understanding of the invention, reference should be made to the accompanying drawings, wherein.

DETAILED DESCRIPTION

Certain embodiments provide for an efficiency service delivery switch between using broadcast bearer to unicast bearer, without replicating data delivery over the core and radio access networks. In addition, the decision to change between broadcast bearer to unicast bearer, or vice versa, can be made by an informed content provider, which can make an optimal decision by accounting for the efficiency of the transmission in the radio network. In some embodiments, a decision can be made based on the evolved NodeB (eNB) synchronization areas, and the multimedia broadcast or multicast single frequency network (MBSFN) area configuration.

In certain embodiments, MBMS architecture can support dynamically adapting a network's streaming capabilities, while at the same time optimally utilizing radio resources. For example, in order to support events such as the Olympics, with unpredictable number of receivers of live content streaming, certain embodiments may provide for a dynamic streaming environment capable of supporting the streaming capabilities of the network. During the Olympics, various different events run parallel to each other, and are live streamed on the network. During popular events, the network may get congested. An improved MBMS platform can be used to support this dynamic streaming of media data, or other kind of data.

In some embodiments, the choice between broadcast and unicast delivery may not be based on predetermined, configured thresholds for a particular service. Instead, according to certain embodiments, the decision to switch between broadcast to unicast delivery, or vice versa, can be based, for example, on radio resource situations, number of interested user equipment (UE), and frequency synchronization across multiple cells in the radio network.

Certain embodiments may only have one delivery method from the content provider towards the cellular network. A single delivery method may be used to avoid duplicate transmission of content or data. The delivery method can also be transparent, meaning that the content provider may account for the streaming demand before a decision on which data delivery method to use can be reached.

The content and data for the streaming service may be delivered over IP multicast from a gateway to the relevant eNBs in the RAN. Based on the received content and data, and based on various other criteria, a network entity in the RAN may determine to use broadcast delivery method, such as MBSFN or single cell point to multipoint (SC-PTM), or a unicast delivery method to deliver the streaming service to at least one UE. The network entity in the RAN making the delivery switching decision may be a multi-cell/multicast coordination entity (MCE). The MCE, in certain embodiments, can receive consolidation information about the streaming service consumption from other network entities or streaming service providers. The MCE may then use the received information along with additional criteria to select the delivery method.

Figure 2:
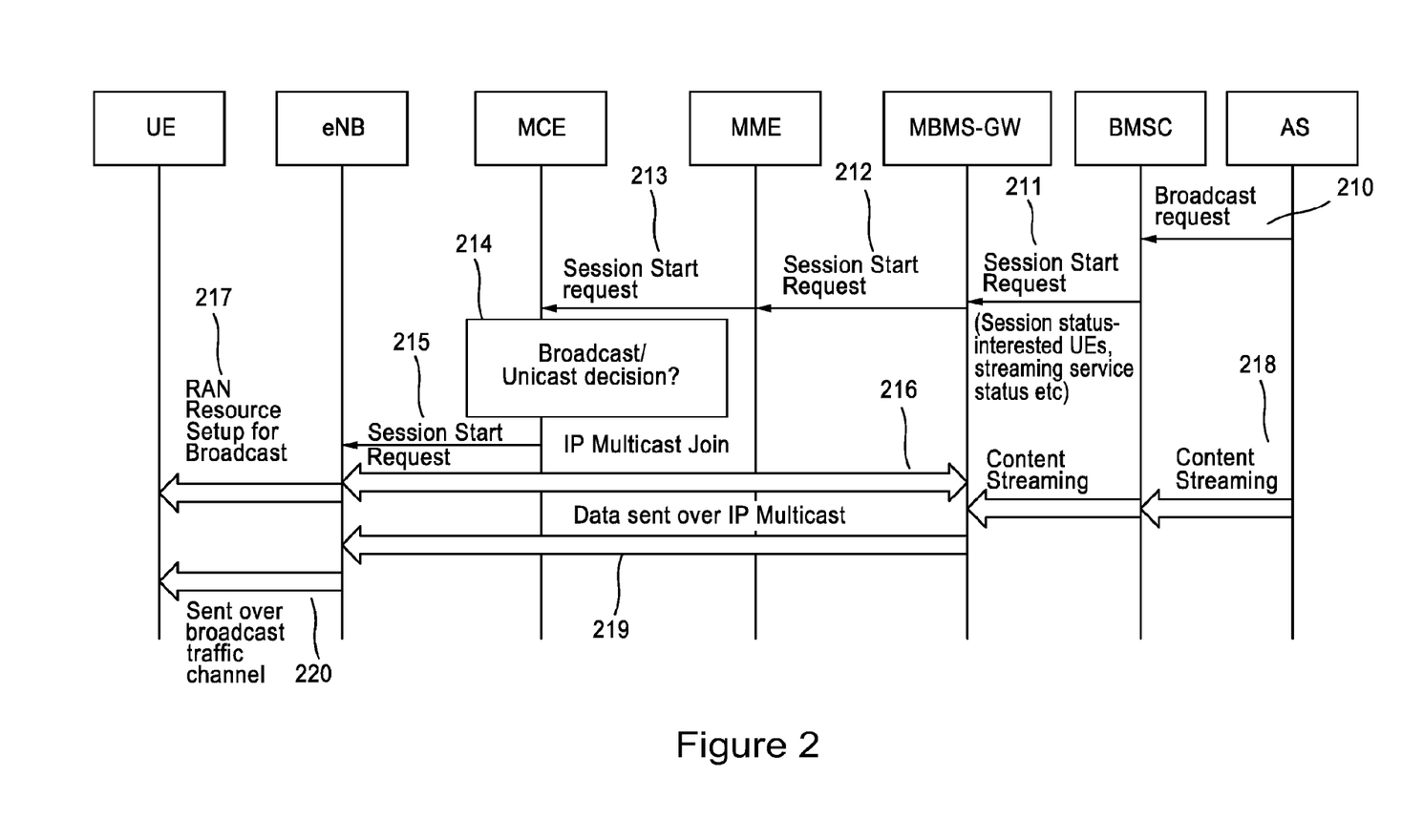
FIG. 2 illustrates a signal flow diagram according to certain embodiments.

FIG. 2 illustrates a signaling flow diagram according to certain embodiments. In step 210, an application or content server (AS) can send a broadcast request message to a broadcast-multicast service center (BMSC). The message may include a request to establish a broadcast session for live streaming of certain content. The BMSC can then initiate a session start request for the content. In doing so, the BMSC can send a session start request message to the MBMS gateway, as shown in step 211. The message from the BMSC may include various parameters, including the number of interested UEs, streaming service status or type, as well as other information used to indicate how long MBMS may be needed, and the current status of streaming. In step 212, the MBMS gateway can forward the session start request to an MME, which may then forward the session start request message to the MCE, as shown in step 213.

Based on the information received in the session start request message, the MCE may then decide whether to broadcast the data or content, using for example, MBSFN or SC-PTM, or to use a unicast delivery for the requested streaming session. In some embodiments, one criterion for selection of the delivery method may be the size of the MBSFN area. For example, a larger MBSFN area may warrant the use of broadcast delivery. A larger area may include a larger number of UEs, in which case broadcast delivery using MBSFN may be more efficient use of network resources than unicast delivery or broadcast delivery using SC-PTM. A smaller area, on the other hand, may include a smaller number of UEs, in which case a unicast delivery or broadcast delivery using SC-PTM may be a more efficient use of network resources.

Another criterion that can be used by the MCE, in certain embodiments, may be the UE distribution in a MBSFN area on a cell level. For example, the UE distribution may be characterized as even, where there may be a UE interested in MBMS service in each cell that is part of the MBSFN area. Alternatively, the UE distribution may be characterized as a hot spot, where there are cells that have no UEs interested in MBMS service, while other cells have a plurality of UEs that are interested in MBMS.

Another criterion may be the number of radio resource control (RRC) connected UEs in a cell. A variation of this criterion may be the average number of UEs per cell, where the average number of UEs thresholds are determined from effective spectral efficiencies of the delivery methods. The effective spectral efficiency of MBSFN may be directly proportional to the ratio of cells that have UEs interested in MBMS service to the number of cells constituting MBSFN area. The effective spectral efficiency may vary between network deployments. In some embodiments, the number of connected UEs in a cell can be used in conjunction with the UE distribution in a MBSFN area on a cell level to determine the delivery method. The following table provides one example of how the selection can be performed at a network entity, such as an MCE:

TABLE 1

An example of a delivery method determination

| UE distribution in MBSFN area | Avg. # UEs per cell | Delivery method |
| --- | --- | --- |
| even | >2 | MBSFN |
| even | ≤2 | Unicast |
| hot spots | >6 | SC-PTM |
| hot spots | ≤6 | Unicast |

As shown in Table 1, the UE distribution within the MBSFN area and the average number of UEs per cell can be considered in conjunction to determine the delivery method. When the UE distribution within the MBSFN area is even, and the average number of UEs per cell is greater than 2, the network entity may choose a broadcast delivery method, specifically MBSFN. In some embodiments, using the MBSFN may have a threshold of an average number of two UEs per cell. Using SC-PTM may also have a threshold of an average number of UEs per cell. As discussed above, the spectrum efficiency of unicast depends on the number of receiving UEs interested in MBMS service. In some embodiments MBSFN may be more spectral efficient than SC-PTM, assuming that the MBSFN area can be large enough, for example greater than 2 cells.

According to the example illustrated in Table 1, if the UE distribution in the MBSFN area is even, and the average number of UEs per cell is less than or equal to 2, the network entity may choose a unicast delivery method. A unicast delivery method may also be chosen if the UE distribution method in MBSFN area includes hot spots, and the average number of UEs per cell is less than or equal to six. Further, Table 1 illustrates that a broadcast delivery, specifically an SC-PTM, can be used when the UE distribution method in the MBSFN area includes hot spots, and the average number of UEs per cell is greater than six. In some embodiments, a hot spots distribution of UEs may have a negative impact on the effective spectral efficiency of MBSFN.

In other embodiments, a combination of any of the above criteria, along with any other criteria that may be helpful to a network entity to decide the method of delivery, can be used.

In the embodiment in FIG. 2, step 214 involves the MCE making the determination based on the received information and the at least one criteria. The MCE may then schedule resources for broadcast delivery, and can send a session start request message to the eNB, in step 215. User plane connection, can then be established through joining IP multicast group in step 216, which can be an IP Multicast between the MBMS gateway and each RAN node involved with the provisioning of the streaming service. The user plane connection, for example IP Multicast, may be used for either unicast or broadcast delivery. The user plane connection may be used to deliver content and/or data from the BMSC to the eNB, through the MBMS gateway. Utilizing this user plane connection may preserve core network resources, as well as facilitate savings in the core network capacity. This IP Multicast can be more efficient then the unicast delivery over the core network in which multiple unicast connections exist between the gateway and the RAN nodes.

Even in a case where the network entity in the RAN can decide to switch from broadcast delivery to unicast delivery, MBMS bearer between the BM-SC and the RAN node can be kept, and used to send packets over IP multicast channel from the content provider to the at least one eNB. In other words, from the core network perspective, the transmission over the core network may be characterized as agnostic. Based on the decision taken by the MCE, the at least one eNB may then use a unicast channels to send data to individual UEs.

Assuming broadcast was chosen in step 214, in step 217 the eNB can send a RAN resource setup for broadcast traffic channel to the UE. In addition, in step 218 the application server can begin streaming data and/or content, and can send the data and/or content to the BMSC, which then forwards the data and/or content to the MBMS gateway. In step 219, the streaming data and/or content can be sent over the IP multicast channel to the RAN node. The RAN node can then send the received data and/or content over the broadcast traffic channel to the UEs.

Figure 3:
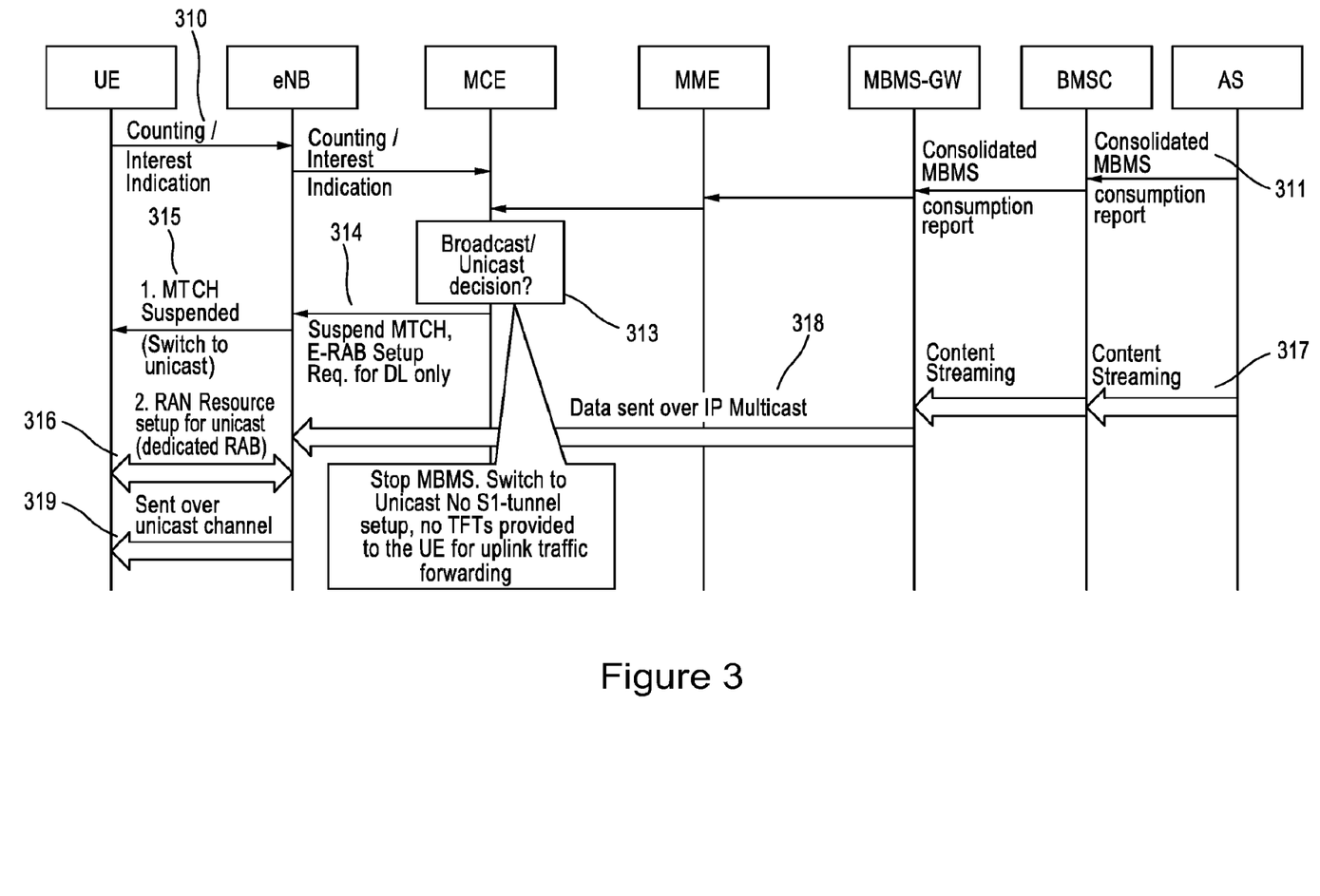
FIG. 3 illustrates a signal flow diagram according to certain embodiments.

FIG. 3 illustrates a signal flow diagram according to certain embodiments. In the embodiment shown in FIG. 3, the content/data can be streamed to UEs over a broadcast traffic channel. At any time during the broadcast session, the MCE may determine based on current information and the at least one criteria that unicast delivery may be more suitable.

In step 310, the UE can send to the eNB a E-UTRAN counting message, which can include information about MBMS service(s) UE is receiving or interested to receive. The eNB consolidates the counting information received from UEs and the eNB sends the consolidated counting information, which can include the number of RRC connected UEs in a cell, to the MCE. The UE can also send the eNB an interest indication. The eNB may then forward the interest indication to the MCE. In some embodiments, the MCE may initiate the counting procedure by instructing the eNBs to send the counting request to the UEs. The eNBs may then send a counting request to the UEs.

In some embodiments, the MBMS counting procedure, which can be included in the counting message from the eNB, may not be by itself be enough to provide the MCE with sufficient information to decide to switch a current broadcast delivery method to a unicast delivery method. First, only RRC connected UEs can respond to the request. Second, a UE may respond if it is receiving or if it is interested in receiving MBMS. At times, some UEs that are interested in receiving an MBMS service may therefore not be reported in the counting procedure. For example, a user may be subscribed to MBMS, yet the content may not be displayed to the user. In some embodiments, the counting procedure may not accurately define the proper number of UEs interested in receive MBMS.

The MCE may also receive an MBMS interest indication from the UE. The UE can send the indication to the eNB, as shown in step 310, which may then forward the message to the MCE. M2 interface may be created between the eNB and the MCE. In some embodiments, The M2 application protocol (M2AP) may be used to govern the interface between the eNB and the MCE. The MBMS interest indication may include the population of UEs interested in an MBMS service. The indication may also include a list of frequencies on which a UE can receive, or indicate that the UE may be interested to receive, MBMS service(s). In some embodiments, the UE may send the interest indication only to the eNB. In other embodiments, the UE can send the interest indication directly to any other network entity, other than the eNB, including the MCE.

In addition, the MCE can also receive a consolidated MBMS consumption report. The consolidation information may be received from another network entity in the RAN, or from a streaming service provider. In step 311, the consolidated MBMS consumption report can be sent to the MCE by the application server through the BMSC, the MBMS gateway, and the MME. The consolidated MBMS consumption report may include service as well as traffic characteristics. In some embodiments, the MBMS consumption report may be more accurate than the MBMS counting procedure in measuring the number of interested UEs.

In certain embodiments, the MCE may also receive information relating to eNB resource availability for broadcast and/or unicast services. The information may include at least the available eNB resources from each cell in the network for MBSFN, SC-PTM, or unicast.

In step 313, the MCE may decide based on the received information and the at least one criterion whether the unicast, MBMS using MBSFN, or MBMS using SC-PTM may be more suitable, given the current status of the RAN. If the MCE determines that unicast bearer is more suitable, the MCE may suspend the broadcast traffic channel, such as Multicast Traffic Channel (MTCH), and request for E-UTRAN radio access bearer (E-RAB) setup for downlink transmission only, as shown in step 314. In this embodiment, no S1 tunnel setup need be initiated for uplink and downlink traffic forwarding, as the MBMS GW delivers traffic to the eNB via the IP multicast channel Thus, there is no corresponding EPS bearer for the unicast radio bearer setup to transmit data to the UE. Besides that, no traffic flow template (TFT) needs to be provided to the UE for uplink traffic forwarding. In some embodiments, no TFT need be provided on either side of the unicast bearer.

In step 315, the eNB directs the UE to suspend MTCH. A RAN resource setup procedure for unicast can then be initiated, as shown in step 316. During this setup procedure, the RAN resources for the unicast session are dedicated, and radio access bearers (RAB) are assigned.

In certain embodiments, while the RAN resource setup for unicast is occurring, the application server can begin content streaming, and can send data and/or content through the BMSC to the MBMS-GW, as shown in step 317. The MBMS-GW can then send the data and/or content over the IP multicast to the eNB, as shown in step 318. Even when the MCE can decide to switch from MBMS delivery to unicast delivery, in certain embodiments, the bearer between the MBMS gateway (MBMS-GW) and the eNB established in step 216 may be kept. The MBMS-GW may then use the IP multicast to send data to the eNB. In step 319, the eNB may then use the established unicast channels, such as E-RAB, to send data from the eNB to the UEs.

Figure 4:
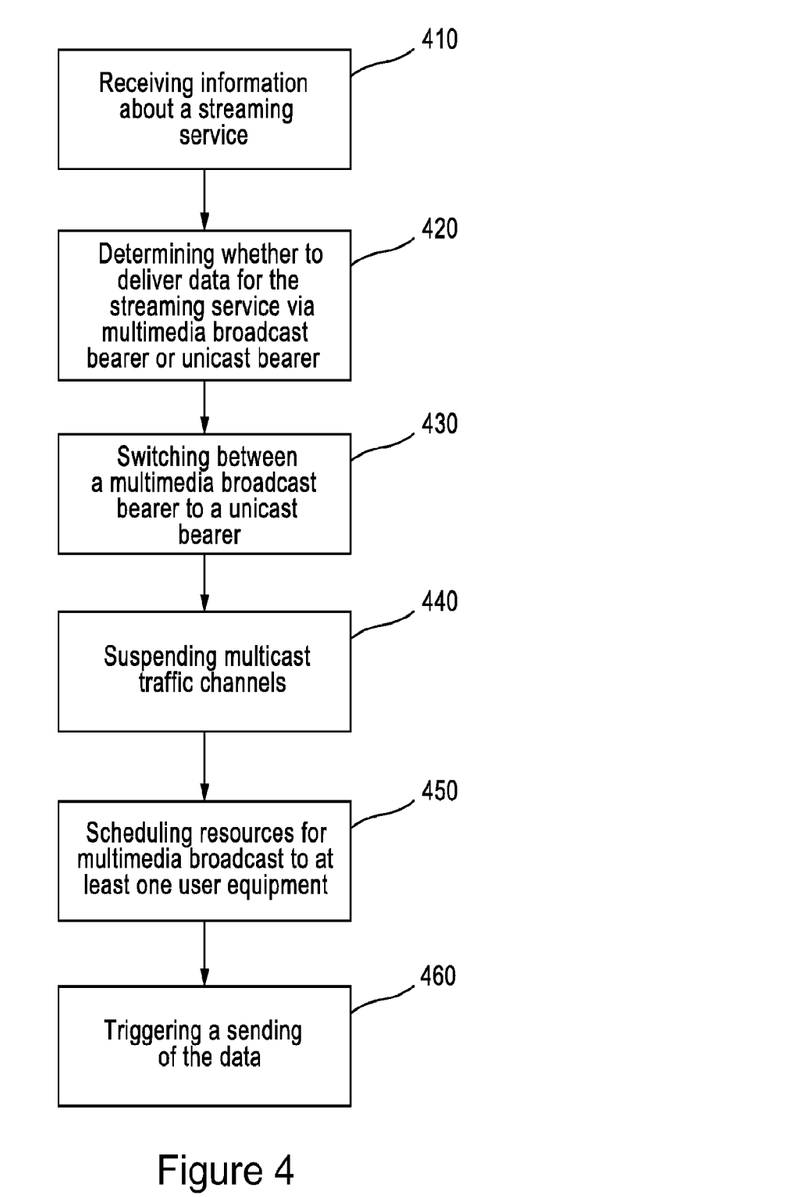
FIG. 4 illustrates a flow diagram according to certain embodiments.

FIG. 4 illustrates a flow diagram according to certain embodiments. In step 410, a network entity may receive information about a streaming service. The information may include, for example, the number of interested UEs, streaming service status or type, a consolidated MBMS consumption report, an MBMS counting message, an MBMS interest indication, and eNB resources availability for broadcast and/or unicast services. The information may include at least one of the above examples, or any other information that may be useful to a network entity. Based on this information, and on other criteria used to evaluate the information, the network entity may determine whether to deliver data for the streaming service via multimedia broadcast or unicast, in step 420.

Assuming that streaming content was already being broadcasted, in step 420 the network entity can decide that unicast delivery may be more appropriate, and in step 430 the network entity can trigger a switching of the delivery method from a multimedia broadcast to a unicast delivery. The network entity can then suspend the multicast traffic channels, as shown in step 440, and request for E-RAB setup for downlink transmissions. In step 450, the network entity can schedule resources for multimedia broadcast to at least one user equipment. In other embodiments, this scheduling may be done by a separate network entity, which may not be the entity making the decision whether to use broadcast or unicast. The network entity can then trigger a sending of the streaming content and/or data to the at least one user equipment, as shown in step 460.

Figure 5:
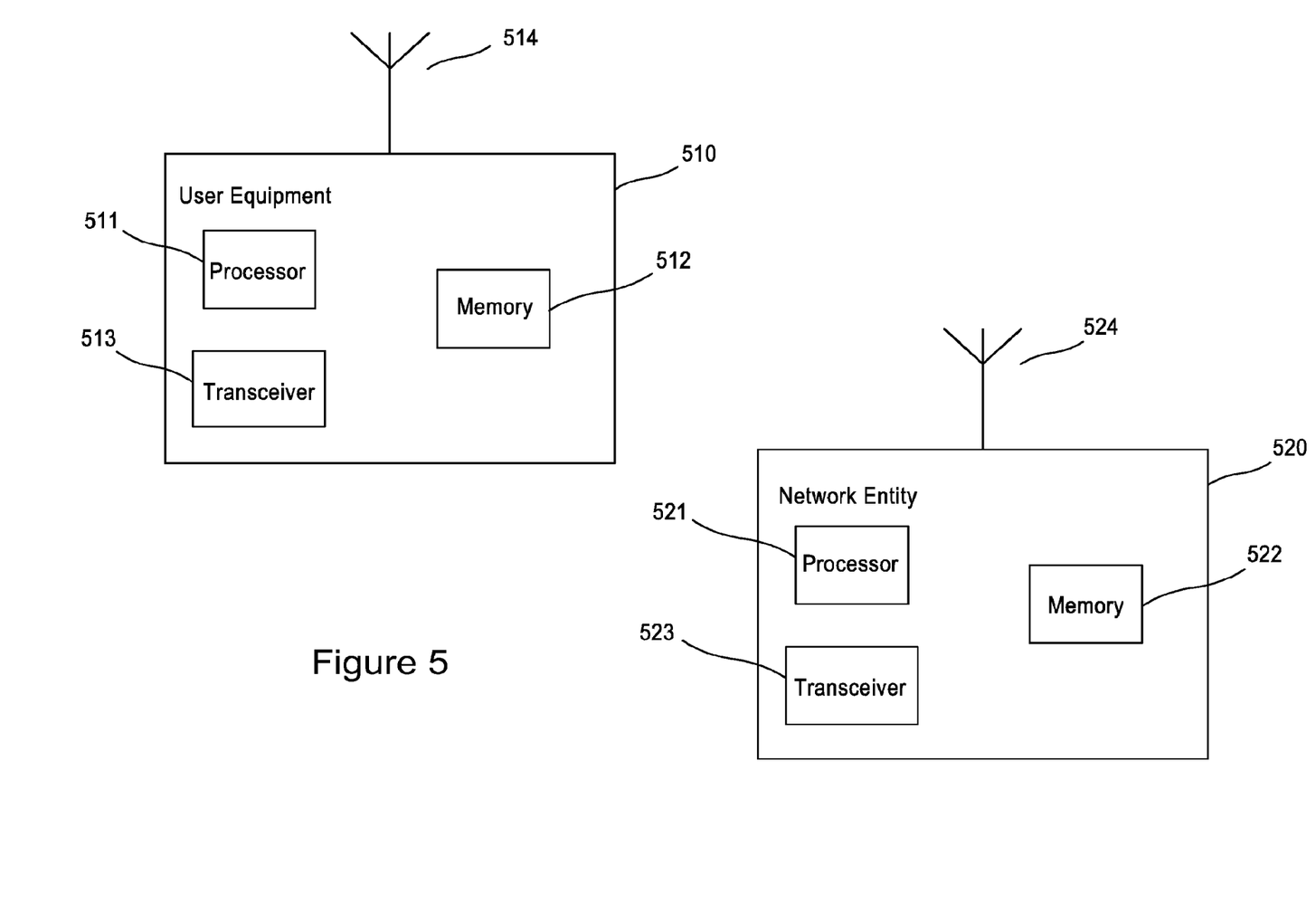
FIG. 5 illustrates a system according to certain embodiments.

FIG. 5 illustrates a system according to certain embodiments. It should be understood that each block of the signal flow charts in FIGS. 2 and 3, and the flow chart in FIG. 4, or any combination thereof, may be implemented by various means or their combinations, such as hardware, software, firmware, one or more processors and/or circuitry. In one embodiment, a system may include several devices, such as, for example, a network entity 520 or UE or user device 510. The system may include more than one UE 510 and more one network entities 520, although only one access node shown for the purposes of illustration. An network entity can be a network node, a base station, an eNB, an MCE, an MME, an MBMS gateway, a BMSC, a server, a host or any of the other access or network node discussed herein.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, a network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use may be to make a network node deliver local content. One or more functionalities may also be implemented as virtual application(s) in software that can run on a server.

A user device or user equipment 510 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiment, an apparatus, such as an access node, may include means for carrying out embodiments described above in relation to FIGS. 2, 3, and 4. In certain embodiments, at least one memory including computer program code can be configured to, with the at least one processor, cause the apparatus at least to perform any of the processes described herein.

According to certain embodiments, an apparatus 520 may include at least one memory 522 including computer program code, and at least one processor 521. The at least one memory 522 and the computer program code are configured, with the at least one processor 521, to cause the apparatus 520 at least to receive information about a streaming service, and determine by a network entity in a radio access network whether to deliver data from the streaming service via multimedia broadcast or unicast based on the information, and predetermined criteria for evaluating the information. The at least one memory 522 and the computer program code are configured, with the at least one processor 521, to also cause the apparatus 520 at least to trigger the sending of the data via the multimedia broadcast or the unicast.

According to certain embodiments, an apparatus 520 may include means for receiving information about a streaming service, and means for determining by a network entity in a radio access network whether to deliver data from the streaming service via multimedia broadcast or unicast based on the information, and predetermined criteria for evaluating the information. The apparatus 520 may also include means for triggering the sending of the data via the multimedia broadcast or the unicast.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as a network entity 520 or UE 510, to perform any of the processes described above (see, for example, FIGS. 2, 3, and 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 5 illustrates a system including a network entity 520 and UE 510, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and a network entity, such as a relay node. For example, the UE 510 may be configured for device-to-device communication.

The embodiments described above provide a solution that allows for optimal switching between broadcast delivery, such as MBSFN and SC-PTM, and unicast delivery. In addition, some embodiments allow for a single delivery method of content and/or data from the content provider towards the cellular network. This delivery method can be transparent to the content provider, allowing the content provider to be informed of various network conditions.

Some embodiments also provide for a user plane connection, for example an IP multicast, between the gateway and each RAN node involved in the provisioning of the service for unicast or broadcast delivery. This allows the core network to save resources and maximize the network capacity, by preventing a multiplicity of unicast connections between the gateway and RAN nodes.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary
MBMS Multimedia Broadcast/Multicast Service
MCE Multi-cell/multicast Coordination Entity
BMSC Broadcast-Multicast Service Center
UE User Equipment
eNB Enhanced NodeB
SC-PTM Single Cell Point to Multipoint
RAN Radio Access Network

We claim:

1. A method, comprising:
receiving information about a streaming service;
determining, by a network entity in a radio access network, whether to deliver data for the streaming service via multimedia broadcast or unicast based on the information and predetermined criteria for evaluating the information, wherein the predetermined criteria comprises at least one distribution of a plurality of user equipment in at least one multimedia broadcast multicast single frequency network (MBSFN) area on at least one cell level in the radio access network associated with an average number of user equipment per cell in the at least one MBSFN area; and
triggering a sending of the data via the multimedia broadcast or the unicast, the method further comprising:
comparing the average number of user equipment per cell with a first predetermined threshold to choose a delivery method to deliver data for the streaming service based on a comparison result where there is a user equipment associated with multimedia broadcast multicast services service in each cell that is part of the MBSFN area, and
comparing the average number of user equipment per cell with a second predetermined threshold to choose a delivery method to deliver data for the streaming service based on a comparison result where there are first cells that have no user equipment interested in multimedia broadcast multicast services service and second cells that have a plurality of user equipment that are associated with multimedia broadcast multicast services.

2. The method according to claim 1, further comprising: triggering a switching between a multimedia broadcast to a unicast, or between a unicast to a multicast broadcast, based on the information and the predetermined criteria for evaluating the information.

3. The method according to claim 1, further comprising: suspending multicast traffic channels, when switching between a multimedia broadcast to a unicast based on the information and the predetermined criteria for evaluating the information.

4. The method according to claim 1, wherein the predetermined criteria further comprises one or more of at least one size of the broadcast area of the network and a number of the plurality of user equipment connected to a radio resource control in each of a plurality of cells of the broadcast area.

5. The method according to claim 1, wherein the streaming service is delivered over a multicast user plane connection between a gateway and a base station in the radio access network, independent of whether content is being delivered via multimedia broadcast or unicast radio.

6. The method according to claim 5, wherein the triggering a sending of the data via multimedia broadcast or unicast occurs on the user plane connection.

7. The method according to claim 1, further comprising: scheduling at least one resource for multimedia broadcast to at least one user equipment.

8. The method according to claim 1, wherein the information about the streaming service is drawn from at least one of a multimedia broadcast or multicast service counting procedure, multimedia broadcast or multicast service interest indication, consolidated multimedia broadcast or multicast service consumption report, and resource availability of the radio access network.

9. The method according to claim 1, wherein the multimedia broadcast comprises a multicast service including a single cell point to multipoint or a multimedia broadcast single frequency network.

10. The method according to claim 1, wherein the network entity comprises a multi-cell or multicast coordination entity.

11. The method according to claim 1, wherein the information about the streaming service is received from another network entity, a streaming service provider, or the radio access network.

12. The method according to claim 1, wherein the unicast comprises a unicast bearer that is established without a corresponding evolved packet system bearer, and wherein no traffic flow template is needed on either side of the unicast bearer.

13. An apparatus, comprising:
at least one memory comprising computer program code; and
at least one processor,
wherein the at least one memory and the computer program code are configured, with the at least one processor, to cause the apparatus at least to:
receive information about a streaming service;
determine whether to deliver data for the streaming service via multimedia broadcast or unicast based on the information and predetermined criteria for evaluating the information, wherein the predetermined criteria comprises at least one distribution of a plurality of user equipment in at least one multimedia broadcast multicast single frequency network (MBSFN) area on at least one cell level in the radio access network associated with an average number of user equipment per cell in the at least one MBSFN area; and
trigger a sending of the data via the multimedia broadcast or the unicast, wherein the at least one memory and the computer program code are further configured, with the at least one processor, to cause the apparatus at least to:
compare the average number of user equipment per cell with a first predetermined threshold to choose a delivery method to deliver data for the streaming service based on a comparison result where there is a user equipment associated with multimedia broadcast multicast services service in each cell that is part of the MBSFN area, and
compare the average number of user equipment per cell with a second predetermined threshold to choose a delivery method to deliver data for the streaming service based on a comparison result where there are first cells that have no user equipment interested in multimedia broadcast multicast services service and second cells that have a plurality of user equipment that are associated with multimedia broadcast multicast services.

14. The apparatus according to claim 13, wherein the at least one memory and the computer program code are further configured, with the at least one processor, to cause the apparatus at least to:
trigger a switching between a multimedia broadcast to a unicast, or between a unicast and a multimedia broadcast, based on the information and the predetermined criteria for evaluating the information.

15. The apparatus according to claim 13, wherein the predetermined criteria further comprises one or more of at least one size of the broadcast area of the network and a number of the plurality of user equipment connected to a radio resource control in each of a plurality of cells in the broadcast area.

16. The apparatus according to claim 13, wherein the streaming service is delivered over a multicast user plane connection between a gateway and a base station in the radio access network, independent of whether content is being delivered via multimedia broadcast or unicast radio.

17. The apparatus according to claim 13, wherein the triggering a sending of the data via multimedia broadcast or unicast occurs on the user plane connection.

18. The apparatus according to claim 13, wherein the at least one memory and the computer program code are further configured, with the at least one processor, to cause the apparatus at least to:
schedule at least one resource for multimedia broadcast to at least one user equipment.

19. The apparatus according to claim 13, wherein the information about the streaming service is drawn from at least one of a multimedia broadcast or multicast service counting procedure, multimedia broadcast or multicast service interest indication, consolidated multimedia broadcast or multicast service consumption report, and resource availability of the radio access network.

20. The apparatus according to claim 13, wherein the multimedia broadcast comprises a multicast service including a single cell point to multipoint or a multimedia broadcast single frequency network.

21. The apparatus according to claim 13, wherein the network entity comprises a multi-cell or multicast coordination entity.

22. The apparatus according to claim 13, wherein the information about the streaming service is received from another network entity, a streaming service provider, or the radio access network.

23. The apparatus according to claim 13, wherein the unicast comprises a unicast bearer that is established without a corresponding evolved packet system bearer, and wherein no traffic flow template is needed on either side of the unicast bearer.

24. A non-transitory computer-readable medium encoding instructions that, when executed in hardware, perform a process according to claim 1.

25. An apparatus comprising means for performing a process according to claim 1.

26. A computer program product embodied on a non-transitory computer-readable medium, said computer-readable medium encoding instructions that, when executed in hardware, perform a process according to claim 1.

* * * * *